R. C. HILTON.
CRANKING DEVICE FOR INTERNAL COMBUSTION ENGINES.
APPLICATION FILED NOV. 13, 1908.
947,494.  Patented Jan. 25, 1910.
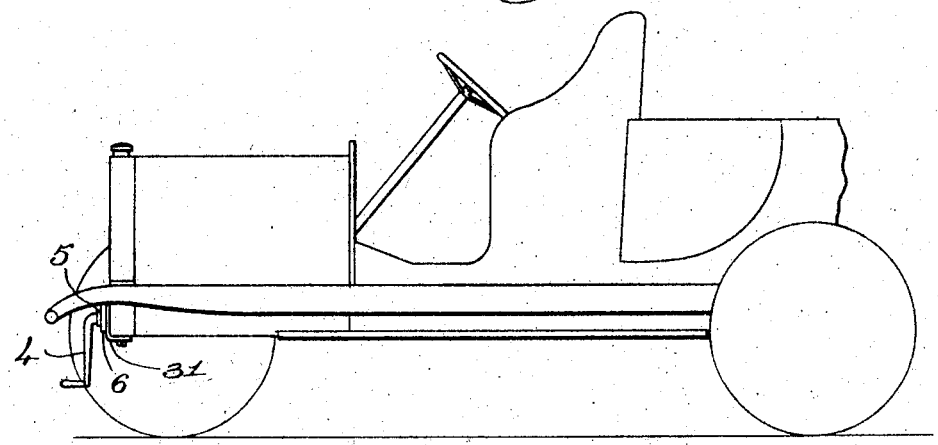
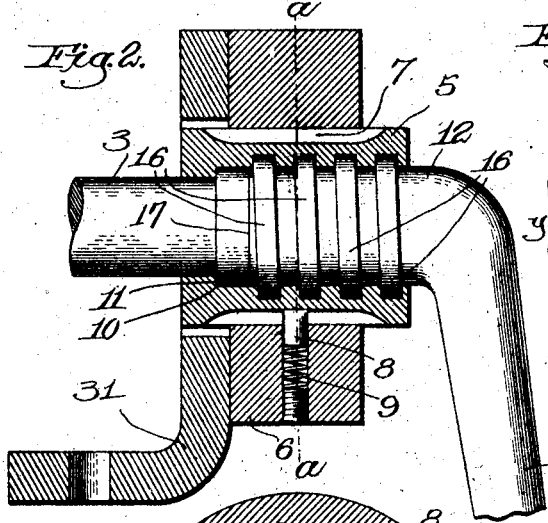
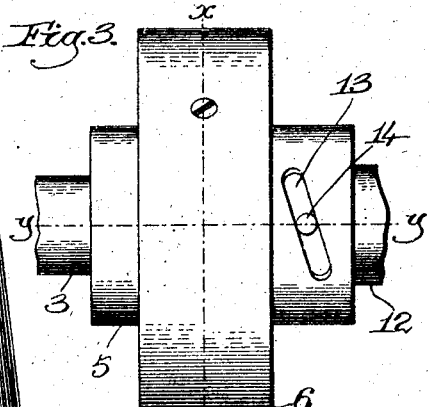
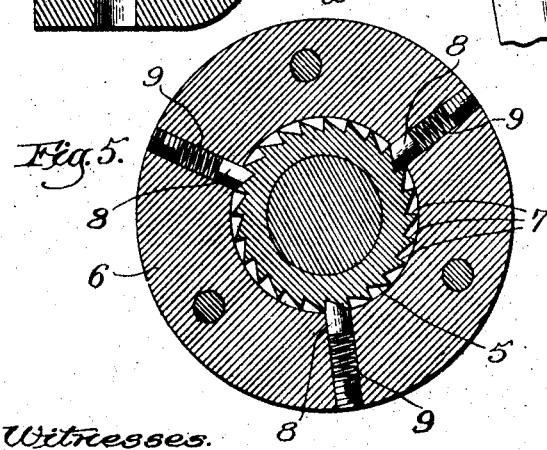
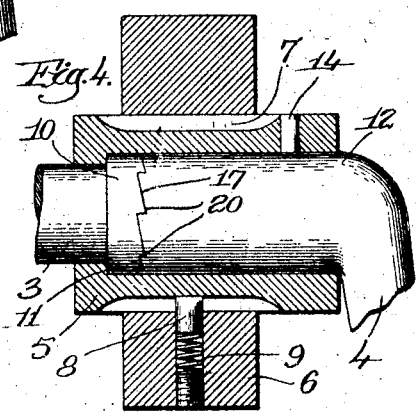
Witnesses.
Thomas J. Drummond
Joseph M. Ward
Inventor.
Roland C. Hilton,

UNITED STATES PATENT OFFICE.

ROLAND C. HILTON, OF QUINCY, MASSACHUSETTS, ASSIGNOR, BY DIRECT AND MESNE ASSIGNMENTS, TO HILTON MANUFACTURING COMPANY, OF BOSTON, MASSACHUSETTS, A CORPORATION OF MASSACHUSETTS.

CRANKING DEVICE FOR INTERNAL-COMBUSTION ENGINES.

947,494.  Specification of Letters Patent.  Patented Jan. 25, 1910.

Application filed November 13, 1908. Serial No. 462,400.

*To all whom it may concern:*

Be it known that I, ROLAND C. HILTON, a citizen of the United States, residing at Quincy, county of Norfolk, and State of Massachusetts, have invented an Improvement in Cranking Devices for Internal-Combustion Engines, of which the following description, in connection with the accompanying drawing, is a specification, like characters on the drawing representing like parts.

This invention relates to a cranking device for use in starting internal combustion engines and has for its object to provide a novel device of this character which will automatically disconnect the starting crank shaft from the engine shaft whenever a back kick occurs.

The features wherein my invention reside will first be described and then pointed out in the appended claims.

Referring to the drawings wherein I have illustrated some selected forms of the invention, Figure 1 is a side view of an automobile having my invention applied thereto; Fig. 2 is a section through a device embodying my invention; Fig. 3 shows a modification; Fig. 4 is a section on the line y—y, Fig. 3; Fig. 5 is a section on the line x—x, Fig. 3, or a—a, Fig. 2.

In the drawings 3 designates the shaft connected with an internal combustion engine and to which the crank 4 is coupled for the purpose of starting the engine. The shaft 3 may be the crank shaft of the engine, or may be a separate shaft which is adapted to be coupled to the crank shaft by a movement in a longitudinal direction, or may be any shaft by which the engine is started.

I will for convenience hereinafter refer to the shaft 3 as the engine shaft, and by this term I mean any shaft to which the crank may be coupled for starting the engine.

As stated above, a coupling for connecting the crank 4 with the shaft 3 which embodies my invention is one in which the crank may be coupled to the engine shaft 3 so that a forward turning movement of the crank will drive the engine shaft 3 forward, while a backward movement of the engine shaft 3 will automatically release the coupling connection between said shaft and the crank.

In the embodiments of the invention herein shown the crank and the engine shaft are coupled together through the instrumentality of a sleeve 5 which is shown as rotatably mounted in a fixed block or support 6. Where the device is used on an automobile engine, this block or support 6 will be fixedly secured to the framework of the car by any suitable means, such as a bracket 31. The sleeve 5 has a pawl-and-ratchet connection with the block 6 so that said sleeve can freely turn in one direction but is prevented from turning in the opposite direction.

In the present embodiments of my invention said sleeve is provided on its periphery with a plurality of ratchet teeth 7 with which coöperate spring-pressed pawls 8 that are mounted in the block or support 6, each pawl being backed by a spring 9. The engine shaft 3 projects into the sleeve and is provided at its end with a head 10 which bears against a shoulder 11 formed on the sleeve. The axial portion 12 of the crank 4 has a cam connection with the sleeve so that movement of the crank in one direction will advance the portion 12 axially into the sleeve, while the movement of the crank in the other direction will withdraw said portion 12. In Fig. 2 this result is secured by making the axial portion 12 of the crank with screw threads 16 that engage screw-threads formed in the sleeve 5, and in Figs. 3 and 4, this result is secured by making the sleeve 5 with a cam slot 13 into which projects a pin 14 extending from the axial portion 12 of the crank. In both cases when the crank is turned in one direction, the axial portion 12 thereof will be advanced into the sleeve until the end 17 of said portion 12 engages the head 10 of the engine shaft. When this occurs the crank cannot be advanced any farther into the sleeve, and further continued forward turning movement of the crank will cause the head 10 of the engine shaft to be so firmly gripped between the shoulder 11 and the face 17 on the axial portion of the crank that the engine shaft, crank and sleeve will be coupled together so that all of the parts will move in unison, such forward movement of the sleeve being permitted by the pawls 8. If desired, the face 17 of the crank and the end of the head 10 of the engine shaft may be provided with interlocking ridges or shoulders 20 which shoulders may conveniently be in the form of ratchet teeth, although this is not essential. The presence of such interlocking shoulders or faces serves only to more securely couple the crank to the engine shaft. It will thus be seen that the coupling of the crank to the engine shaft involves merely the turning of the crank forward until the end face 17 thereof is brought up against the head 10 of the engine shaft. If, after the crank is thus coupled to the engine shaft, said engine shaft should be turned backwardly, as sometimes happens when the engine becomes reversed in starting, the backward movement of the engine shaft would tend to turn the crank 4 and the sleeve 5 backwardly, but as the sleeve is held from backward rotation by the pawls 8, such backward movement of the engine shaft will only result in backing the crank out of the sleeve sufficiently to disengage the face 17 of the crank from the head 10 of the engine shaft. When this occurs the engine shaft is free to rotate backwardly without carrying the crank 4 with it, and there is no danger of injury to the operator from an unexpected backward movement of the crank. In either form of the invention it will take only a slight backward turning movement of the crank to release it entirely from the engine shaft, and such slight backward movement is not sufficient to cause any injury to the person operating the crank.

In some internal combustion engines, the shaft 3 to which the crank is coupled is normally disconnected from the engine crank shaft but is adapted to be coupled thereto by moving said shaft 3 longitudinally. Where the engine has this construction the operation of coupling the crank to the engine will involve first pushing the crank 4, sleeve 5 and shaft 3 longitudinally sufficiently to couple said sleeve to the crank shaft of the engine and then turning the crank 4 as above described to couple said crank to the shaft 3. This longitudinal movement of the sleeve 5 is permitted by making the ratchet teeth 7 of considerable length, as shown clearly in Figs. 2 and 4, so that any movement of the sleeve longitudinally will not throw the pawl or pawls 8 out of engagement with the teeth.

In the construction shown in Figs. 3 and 4, the slot 13 may have such a relation to the inclined faces of the teeth 20 that the engine shaft 3 will be automatically disengaged from the crank by a movement of the engine shaft 3 either forwardly or backwardly relative to the axial portion of the crank 4. For instance, if the slot 13 has a greater inclination than the faces of the teeth 20, then if the engine shaft 3 starts to rotate forwardly at a greater speed than the axial portion 12 of the crank, the inclined faces on the ends of the head 10 and the portion 12 of the shaft will force the crank backwardly sufficiently to disengage the face 17 from the head.

I have shown herein only two embodiments of my invention, but they are sufficient to illustrate the principle thereof.

Having fully described my invention, what I claim as new and desire to secure by Letters Patent is:—

1. In a device for cranking internal combustion engines, the combination with an engine shaft, of a ratchet sleeve into which one end of said shaft extends and to which it is swiveled, means to permit the sleeve to rotate freely in one direction while preventing it from rotating in the opposite direction, and a starting crank shaft having a cam engagement with said sleeve whereby turning movement of the crank in one direction will advance it into said sleeve and into locking engagement with the engine shaft and backward movement of the engine shaft will cause the starting crank shaft to be disconnected.

2. In a cranking device for internal combustion engines, the combination with an engine shaft provided at its end with a head, of a coupling sleeve receiving said head and provided with a shoulder against which the head bears, means to prevent the sleeve from rotating in one direction while freely permitting it to rotate in the other, and a crank having an axial portion fitted within the sleeve, said axial portion of the crank and sleeve having interlocking cam parts whereby turning movement of the crank in one direction will advance the axial portion thereof into the sleeve and into locking engagement with the head on the engine shaft.

3. The combination with a shaft, of a cranking member connectible and disconnectible therewith, a ratchet ring, a boss fixed to the cranking member and adapted to enter and be housed by said ring, said ring and boss having a threaded engagement one with the other to connect and disconnect the cranking member from the shaft, and a pawl engaging the ratchet ring, said ratchet ring having a sliding movement lengthwise of the shaft.

4. The combination with a shaft, of a cranking member in line therewith and movable toward and from said shaft, the abutting ends of said member and shaft having clutch faces, said cranking member operative normally to turn the shaft forward, a boss fixed to the cranking member, a ratchet ring inclosing said boss, said ring and boss having a threaded engagement one with the other to connect and disconnect the cranking member from the shaft, and a pawl engaging the ratchet ring, said ring having a sliding movement lengthwise of the shaft.

5. The combination with a shaft, of a cranking member in line therewith and movable toward and from the shaft, the abutting ends of said member and shaft having clutch faces, said cranking member operative normally to turn the shaft forward, means for disconnecting the cranking member from the shaft on the reversal of the shaft, said means including a ratchet ring having a sliding movement lengthwise of the shaft and having an internal spirally arranged flange, a boss fixed to the cranking member and contained within said ring and having a spirally arranged member to co-act with the corresponding member on the interior of the ring, and pawls for engaging the ratchet surface of said ring thereby holding the ring from rotation in one direction.

6. The combination with a shaft, of a cranking device, said cranking device and shaft having complementary clutch members, means for disconnecting the cranking device from the engine shaft, including a ratchet ring having a sliding movement in the line of the shaft, said ratchet ring carrying said cranking device, a pawl acting on the ratchet ring, and means by which the cranking device has a backward movement independent of the ratchet ring, and a lengthwise movement independent thereof:

In testimony whereof, I have signed my name to this specification, in the presence of two subscribing witnesses.

ROLAND C. HILTON.

Witnesses:
LOUIS C. SMITH,
THOMAS J. DRUMMOND.